US011817129B2

(12) United States Patent
Stephens et al.

(10) Patent No.: US 11,817,129 B2
(45) Date of Patent: *Nov. 14, 2023

(54) 3D MEDIA ELEMENTS IN 2D VIDEO

(71) Applicant: Ryff Europe Ltd, Cambridge (GB)

(72) Inventors: Spencer Stephens, Los Angeles, CA (US); Royston Taylor, Los Angeles, CA (US); Mark Turner, Los Angeles, CA (US)

(73) Assignee: RYFF EUROPE LTD., Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,200

(22) Filed: Jun. 27, 2022

(65) Prior Publication Data

US 2022/0328073 A1   Oct. 13, 2022

Related U.S. Application Data

(63) Continuation of application No. 17/274,097, filed as application No. PCT/US2019/050657 on Sep. 11, 2019, now Pat. No. 11,404,089.

(Continued)

(51) Int. Cl.
*G11B 27/036* (2006.01)
*G06T 7/50* (2017.01)
(Continued)

(52) U.S. Cl.
CPC ....... *G11B 27/036* (2013.01); *G06Q 30/0641* (2013.01); *G06T 7/11* (2017.01);
(Continued)

(58) Field of Classification Search
CPC ......... G06T 19/00; G06T 17/20; G06T 17/00; G06T 15/10; G06T 15/00; G06T 17/10;
(Continued)

(56) References Cited

U.S. PATENT DOCUMENTS 11,404,089 B2 * 8/2022 Stephens ............ G06Q 30/0641
2007/0226761 A1   9/2007 Zalewski et al.
(Continued)

FOREIGN PATENT DOCUMENTS

EP   2304725 A1   4/2011
EP   3343490 A1   7/2018
(Continued)

OTHER PUBLICATIONS

"U.S. Appl. No. 17/274,097, Notice of Allowance dated Mar. 25, 2022", 9 pgs.

(Continued)

*Primary Examiner* — Todd Buttram
(74) *Attorney, Agent, or Firm* — SCHWEGMAN LUNDBERG & WOESSNER, P.A.

(57) ABSTRACT

An apparatus for processing media content includes at least one hardware processor coupled to at least one memory. The at least one memory stores instructions that when executed cause the at least one hardware processor to perform operations. The operations include generating three-dimensional (3D) representations of media elements present in one or more two-dimensional (2D) images representing a 2D scene with the media content. A 3D volume representation of the 2D scene is generated based on aggregating the 3D representations. A 3D void space associated with the 2D scene is segmented into a plurality of 3D void segments. The segmenting is based on the 3D volume representation. A 3D media element is inserted into at least one 3D void segment of the plurality of 3D void segments. The one or more 2D images are modified to include the at least one 3D void segment with the 3D media element.

20 Claims, 7 Drawing Sheets

Related U.S. Application Data

(60) Provisional application No. 62/729,508, filed on Sep. 11, 2018, provisional application No. 62/729,510, filed on Sep. 11, 2018, provisional application No. 62/729,507, filed on Sep. 11, 2018.

(51) Int. Cl.

| | | |
|---|---|---|
| *G06T 7/11* | (2017.01) | |
| *G06T 7/70* | (2017.01) | |
| *G06Q 30/06* | (2023.01) | |
| *G06T 19/00* | (2011.01) | |
| *H04L 9/32* | (2006.01) | |
| *G06V 20/40* | (2022.01) | |
| *G06Q 30/0601* | (2023.01) | |
| *G10L 25/57* | (2013.01) | |

(52) U.S. Cl.
CPC .................. *G06T 7/50* (2017.01); *G06T 7/70* (2017.01); *G06T 19/006* (2013.01); *G06V 20/40* (2022.01); *H04L 9/3247* (2013.01); *G06T 2200/24* (2013.01); *G06T 2207/10016* (2013.01); *G06T 2207/20081* (2013.01); *G10L 25/57* (2013.01)

(58) Field of Classification Search
CPC . G06T 17/005; G06T 7/50; G06T 7/11; G06T 7/70; G06T 19/006; G11B 27/036; G06V 20/04; G06Q 30/0641; H04L 9/3247
See application file for complete search history.

(56) References Cited

U.S. PATENT DOCUMENTS

| | | | |
|---|---|---|---|
| 2013/0091519 A1 | 4/2013 | Mclauchlan et al. | |
| 2016/0050465 A1 | 2/2016 | Zaheer et al. | |
| 2021/0201956 A1* | 7/2021 | Stephens | G06T 19/20 |
| 2022/0328073 A1* | 10/2022 | Stephens | G06T 7/70 |

FOREIGN PATENT DOCUMENTS

| | | | | |
|---|---|---|---|---|
| EP | 3850625 A1 | 7/2021 | | |
| GB | 2591404 A | 7/2021 | | |
| WO | WO-2020056027 A1 * | 3/2020 | ......... | G06K 9/00711 |
| WO | WO-2020056027 A1 | 3/2020 | | |
| WO | WO-2020231962 A1 * | 11/2020 | .......... | B41J 2/04505 |

OTHER PUBLICATIONS

"European Application Serial No. 19774032.7, Response filed Jul. 1, 2021 to Communication pursuant to Rules 161(1) and 162 EPC", 23 pgs.

"International Application Serial No. PCT/US2019/050657, International Preliminary Report on Patentability dated Mar. 25, 2021", 10 pgs.

"International Application Serial No. PCT/US2019/050657, International Search Report dated Nov. 27, 2019", 5 pgs.

"International Application Serial No. PCT/US2019/050657, Written Opinion dated Nov. 27, 2019", 11 pgs.

Hedau, Varsha, et al., "Recovering Free Space of Indoor Scenes from a Single Image", Proceedings of IEEE Conference on Computer Vision and Pattern Recognition, (Jun. 16, 2012), 2807-2814.

Huang, Siyuan, et al., "Holistic 3D Scene Parsing and Reconstruction from a Single RGB Image", Arxiv.Org, Cornell University Library, 201 Olin Library Cornell University Ithaca, NY 14853, (Aug. 7, 2018), XP081264409, (Aug. 7, 2018), 17 pgs.

* cited by examiner

3D MEDIA ELEMENTS IN 2D VIDEO

CROSS REFERENCE TO RELATED APPLICATIONS

This application is a continuation of U.S. patent application Ser. No. 17/274,097, filed Mar. 5, 2021, which application is a U.S. National Stage Filing under 35 U.S.C. 371 from International Application No. PCT/US2019/050657, filed on Sep. 11, 2019, and published as WO 2020/056027 on Mar. 19, 2020, which application claims priority to U.S. Provisional Application 62/729,507, filed Sep. 11, 2018 and entitled "Delivery of Individualized Audio Video Content to a User." This application also claims priority to U.S. Provisional Patent Application No. 62/729,506, filed Sep. 11, 2018 and entitled "Identification of Empty Three-Dimensional Volumes in Video." This application also claims priority to U.S. Provisional Patent Application No. 62/729,510, filed Sep. 11, 2018, and entitled "Method for Controlling and Tracking Access to a Computer-Generated Model." The contents of these prior applications are considered part of this application, and are hereby incorporated by reference in their entireties.

BACKGROUND

Advertisement insertion has been in use for some time. That is, targeted advertising may be inserted between 2D scenes in an audio/video (a/v) content, such as a movie or television show. Another form of advertising delivery encompasses product placement in a production, such as deliberate use of a particular brand of cereal in a breakfast 2D scene in a movie. A process called rotoscoping allows identification of the outline of objects in a scene to allow post-production insertion of content into a completed video scene.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
FIG. 1 is an overview diagram showing a 2D scene.

Disclosed are embodiments for insertion of three-dimensional (3D) media elements within two-dimensional video. To prepare for insertion of a 3D media element, the disclosed embodiments generate a 3D representation of a scene within a 2D video stream. Once a 3D representation of the scene is available, empty, or void space within the scene are identified. The void spaces are then prioritized for possible insertion of a 3D media element. The prioritization of the void spaces may consider several factors, including factors that relate to both technical and business aspects. For example, void spaces having a relatively flat horizontal bottom may be prioritized over those other spaces that do not. The flat horizontal bottom, such as a void space above a table top, provides, in some embodiments, a platform upon which to insert a realistically appearing object. Other factors include the size of the void space, lighting within the scene, and a length of time the void space appears in the scene without being blocked and/or transgressed. A trackability of the void space may also be determined. Once the identified void spaces are prioritized, one or more of the highest priority spaces may be selected for insertion of a 3D media element. After a 3D media element has been inserted, the 3D representation of the scene is saved to a non-transient computer readable storage medium (e.g. hard disk), transmitted over a network, or displayed via a 2D output device.

The disclosed embodiments use of a 3D representation of 2D video provides advances when compared to systems that operate within an exclusively 2D environment. For example, by generating a 3D representation of a scene and inserting a 3D object, the 3D representation may be used when multiple perspectives of the scene are displayed. For example, many movies, TV shows, and other content shoot a scene via multiple camera, which captures a scene from multiple perspectives. Solutions that operate in exclusively 2D environments are not able to insert media elements so as to maintain realism when switching between multiple perspectives of a scene. While a 2D based insertion environment may provide for small changes in scene perspectives, for example, a 20 degree change in perspective, the disclosed embodiments facilitate multiple views of scene from virtually any angle offset. For example, a scene that shows a dialogue between two actors sitting at a table may be shot using two cameras, with each of the two cameras focused toward a respective one of the two actors. An inserted item sitting on the table between the two actors may be accurately represented from both camera perspectives, via use of the disclosed embodiments, which can display a 2D video image from each perspective using a common representation of the scene and a common representation of an inserted 3D media element. In contrast, an insertion environment relying exclusively on 2D video processing requires duplicative efforts to render the item from the multiple perspectives. This results in a more costly and less realistic solution when compared to the disclosed embodiments.

Camera tracking information may be utilized to add a 3D media element to a scene. In some embodiments, the tracking information is used to correctly align a 3D media element with geometry of a set represented by the scene as viewed from the camera. In some embodiments, camera tracking is done using knowledge of the geometry of the set or some component in it, for example, a table of a known size. In some cases, construction plans for the set are available and can be used to facilitate 3D media element placement.

In certain genres, media content is captured using fixed camera positions typically using surveillance style cameras which are mounted on the set and can rotate and zoom. These cameras are positioned around the set offering views from different angles.

In a manner similar to systems called volumetric video or spatial tracking of systems such as NCam (http://www.n-cam-tech.com/), output of those cameras can be used to construct an accurate CG model of the set. This method is different in that it requires no particular set up on the set, the cameras used are those used to shoot the program, and it can be done at any point after production is complete.

Such a system and method benefits both original and aftermarket production companies by allowing a "refresh" of original content to include or replace media elements for localization, target audience, or topical relevance. A by-product of the technology is a marketplace for the identification of available spaces in a production, the time on screen and prominence of the available space, as well as the drawing power of the actors/director. The marketplace can be used to match available spaces and to potential items that can be placed in order to determine a value for the space in view of the product. The system allows a "market of one" so that each viewing of a media object can be customized, either at the content delivery source or at the content viewing point (TV, smartphone, tablet, etc.).

Integrating a Computer Generated (CG) element (whether an inert or animated object) into a scene requires particular processing to avoid a result that does not look natural in the context of the original AV content. It may be desirable to enable parties outside of an AV production process to add elements to the AV content after it has been produced. The creation of a 3D media element includes generation of mesh or wire frame information, which is a computer representation of the structure of the element. In some embodiments, the mesh defines a number of polygons connected at the vertices. The mesh is overlaid with a texture, effectively a computer-generated skin that covers the mesh. The texture defines characteristics of the object the element represents. As one example, if the object were an orange, the texture would be shades of orange, have the familiar look of the irregular rind and the way an orange looks at the point where the stem was attached.

As discussed in more detail below, after a void space is identified in a video, a value of the space is determined. The 'value' of the space may be based on a type of object to be displayed in the space. For example, in the product placement arena, if a space suitable for the placement of a bottle is on the table at a family breakfast, the space has a first value with respect to a first product placement (e.g. orange juice) and a second value with respect to a second product placement (e.g. vodka).

A machine learning algorithm determines the level of match by taking attributes of the object, both of its physical properties and requirements such as proximity to an actor and assessing the match with attributes of available spaces. Acceptance or rejection of the matches by the operator drives the algorithm to refine its results in future analysis. Some attributes of the space can be measured. Examples may include a size of the void space, a distance from a camera capturing the scene, a distance from the center of the scene's frame, a duration that the space is in focus, proximity of the void space to each actor in the scene, including whether the void space is handled by an actor, lighting in the scene, a duration within the scene in which the space appears, objective attributes of the content itself, identities of actors that are in the scene, a cast of the content (e.g. movie, episode, or series), a physical location of the scene, a date and/or time of day (e.g. setting) of the scene. Additional attributes include, in some embodiments, a genre or sub-genre of the content (e.g. move, TV show), a 'mood' of the scene, what is the scene about, an intended audience of the scene, a summary of a story told by the content, a wider context of the scene, such as, for example, a relative position of the scene within the content or story.

The mesh and the texture are the first step. The second step is to render the object so that it blends/integrates into the scene. This requires that the element be lit to match the scene and that the relationship of the element to its surroundings, for example the reflection in a shiny surface, are correctly reproduced.

A 3D media element to be inserted into 2D video content includes a mesh definition and a texture definition, which describe properties of the 3D media element that do not necessarily vary across a variety of scenes in which that 3D media element is inserted. However, some attributes of the 3D media element may vary based on one or more properties or attributes of a scene or particular location within a scene in which the 3D media element is inserted. For example, to integrate a 3D element into a scene, a lighting characteristic of the scene is used to determine particular shading of the 3D media element.

Specific modifications to a 3D element to integrate the 3D element into a scene are stored in a template data structure in some embodiments. Access to the template data structure is necessary in some embodiments when including the 3D element in a scene. However, rights holders of the content seek to control access to the template data and also track usage of the 3D media element resulting from application of the template.

In some of the disclosed embodiments, a blockchain ledger is used to fulfill this function. Carried by the blockchain are both the contract (a smart contract) and the template data structure referenced above (e.g. also described below as template 470). In some embodiments, the contract and data template are a payload of the blockchain. In some other embodiments, the blockchain stores a reference (e.g. URL) to the contract and/or data template.

In one embodiment of the blockchain, the ledger may contain a formula, and/or the template for rendering the 3D media element so as to match the scene. In other words, the data necessary to go from the general 3D media element (e.g. mesh and texture) to the specific (rendered video) is accessible via the ledger. In some embodiments, a separate blockchain entry may be used for each scene, meaning the sections of a scene from cut to cut. When a creator of the 3D media element model, the artist, has completed a rendering of the element the result is entered into the ledger. An entry in the ledger may then contain reference to the model, the template and the final rendered video. In some embodiments, the preferred implementation is a permissioned or private blockchain allowing the rights holder for the AV content to maintain control either directly or through a service.

A refinement may be the expression of that space in terms of regular shapes (cubes, spheres, etc.) and their suitability for placement, for example, whether the object provides a base with a horizontal surface or whether the entire volume is hanging in space.

Another refinement may be the use of parameters that limit the volume that must be analyzed. For example, the maximum depth that is of interest may be 3 meters and the analysis can exclude the region of the scene that is further than 3 meters from the camera.

A further analysis pass may determine whether the identified volumes of space are available across more than one shot. Video content is made up of a sequence of shots. Each shot is part of a scene. Each scene takes place on a set. A set is used for one or more scenes and appears in one or more episodes. A comprehensive analysis determines whether the identified space exists in more than one scene. However, such an analysis may work in concert with another form of analysis. A semantic analysis may determine how the volume may be used in the context of continuity and story. Continuity is the process in video production of ensuring visual consistency across multiple shots. For example, if there is a kettle on a table in a scene it needs to be in the same place in every shot in the scene. The story, in this context, is how the use of the volume fits in with the scene's setting and action. For example, using the volume to place a cereal box on a table fits in with the story of a scene if it is breakfast but does not fit if it is dinner time.

The semantic analysis may be assisted by image recognition of what is in the scene, speech recognition of the dialog, and the script which has dialog and staging instructions. Closed captions and audio descriptions for the visually impaired may also be used.

Other attributes may be assigned to each volume of space to express 'usefulness' of the volume. This may not be a single value, it may be a set of values that describe the commercial value of the volume of space for the placement of a CG object and the difficulty level for each process used to create the CG element that will be placed in the volume of space. For example, the commercial value may be greater for a volume close to the camera and less if the volume is out of focus. The difficulty level for rotoscoping would reflect the difficulty of rotoscoping the scene. Rotoscoping is the process of tracing the outline of an object in the scene. Rotoscoping hair FIG. 1 is an overview diagram showing a 2D scene. The scene shows two actors 102a-b. Actor 102b is holding a cereal box 104. The scene 100 also shows a countertop 106 and a window 110. The scene 100 provides an opportunity for product placement of the cereal box 104. Traditional 2D methods of insertion would facilitate such an opportunity. Such an opportunity is typically facilitated via human artists that manually insert the product placement into the scene 100. Because of the relatively high overhead associated with product placement, such a traditional placement is generally global and perpetual. The placement is sold once and remains indefinitely. A brand manager for the cereal also does not receive any visibility into who watched tor interacted with the scene.

Figure 2:
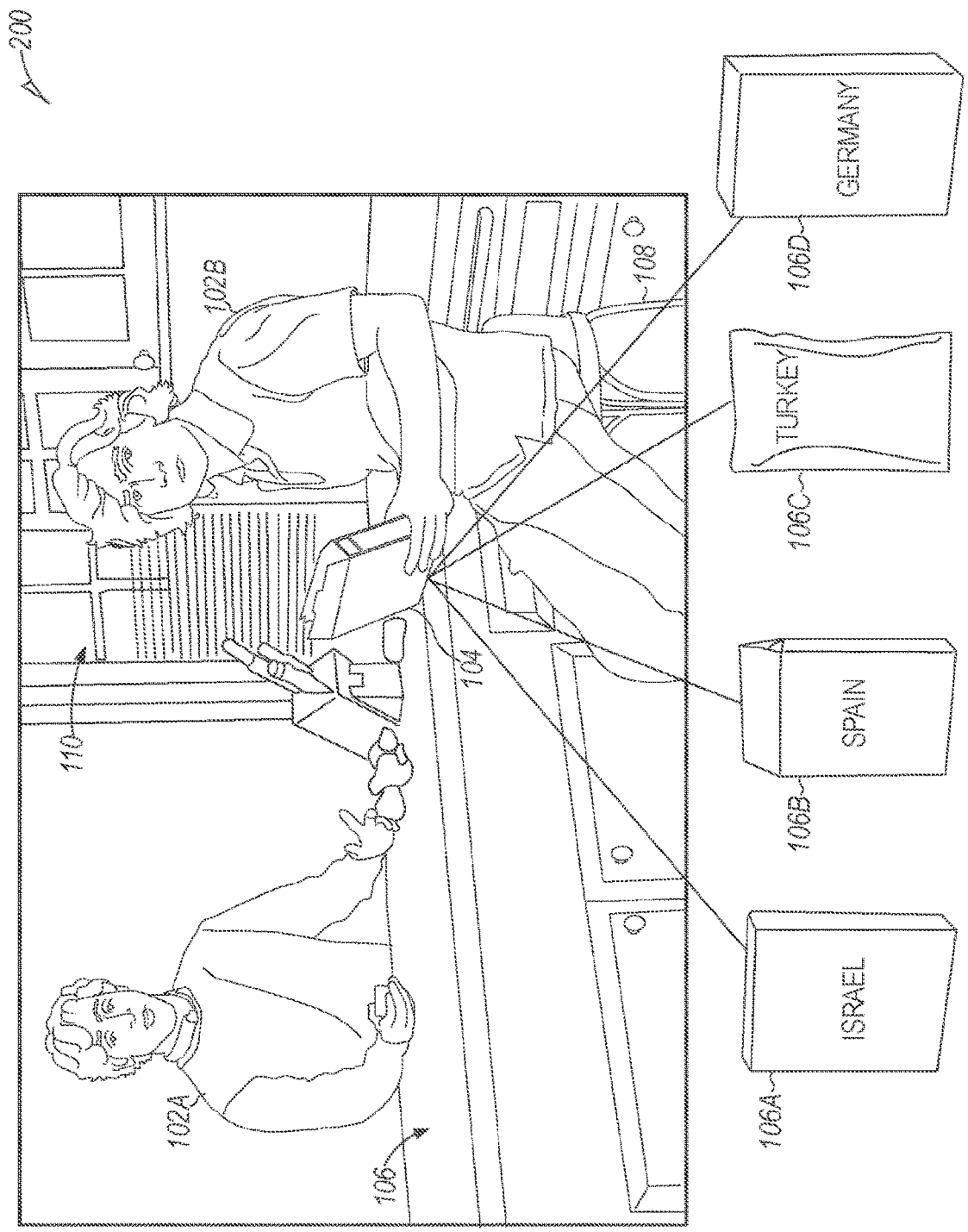
FIG. 2 shows a second overview diagram demonstrating product placement opportunities enabled by the disclosed embodiments

FIG. 2 shows a second overview diagram demonstrating product placement opportunities enabled by the disclosed embodiments. FIG. 2 shows a scene 200 that could be processed by one or more of the disclosed embodiments. FIG. 2 shows that the cereal box 104 may be replaced with various other versions of the cereal box 106a-d, depending on, for example, a locality where a video including the scene is presented. The ability to perform dynamic placement via contextual insertion based on viewer, region, time of day, and viewing distance, among other parameters, creates new revenue opportunities for funding content distribution.

Figure 3:
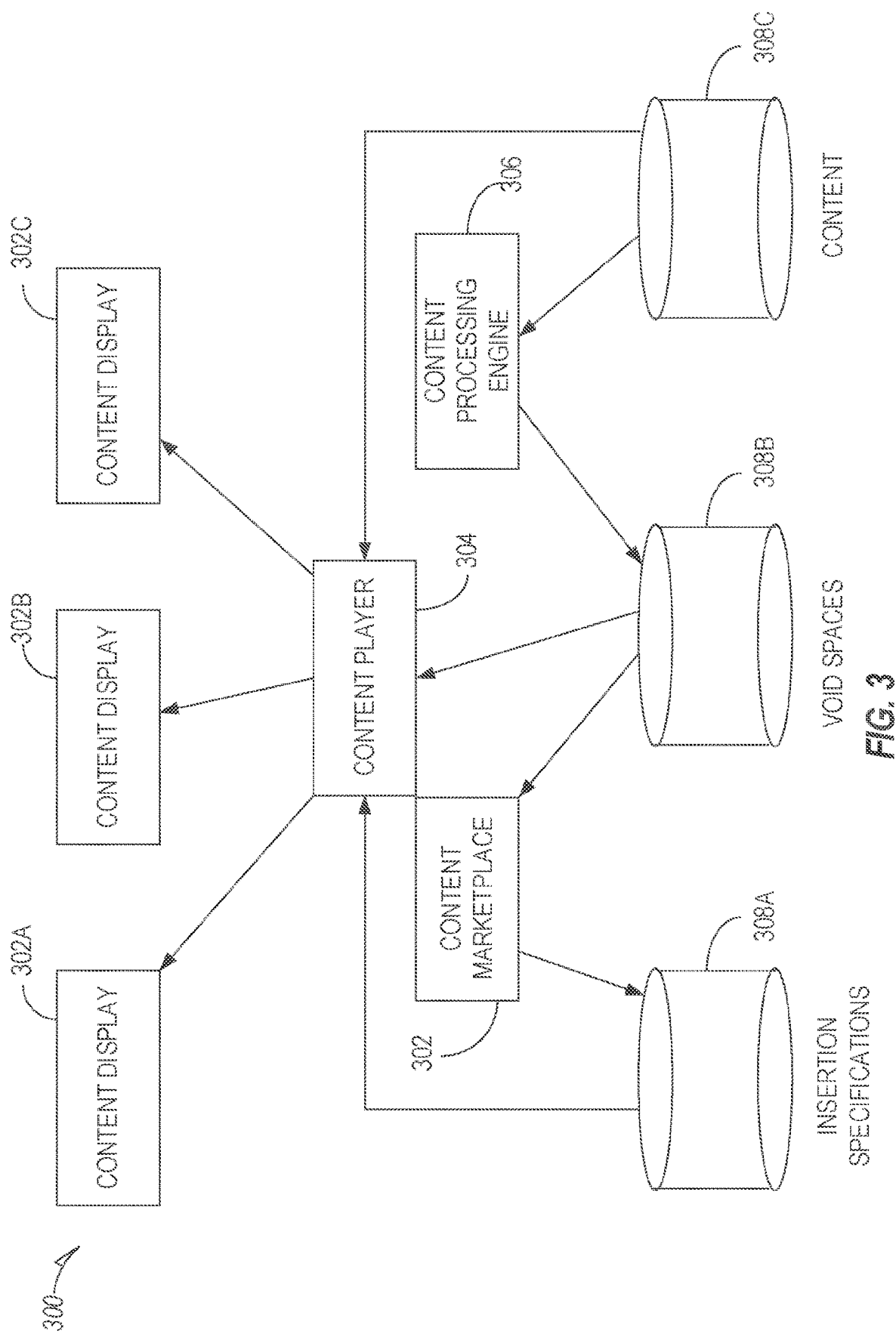
FIG. 3 shows three software components, a marketplace 302, player 304, and content processing engine 306.

FIG. 3 is a data flow diagram illustrating software components and data flows that are implemented in one or more of the disclosed embodiments. The system 300 discussed below with respect to FIG. 3 provides for dynamic 3D content insertion into 2D video.

FIG. 3 shows three software components, a marketplace 302, player 304, and content processing engine 306. FIG. 3 also illustrates three data stores, an insertion specifications data store 308a, void spaces data store 308b, and a content data store 308c. The content processing engine 306 reads content data from the content data store 308c. The content data store stores data defining multimedia content. For example, the content data store stores data defining one or more of movies, TV shows, or other multimedia content. The content processing engine 306 processes this content to identify void spaces included in the content that may be candidates for insertion of an additional 3D media element. As discussed further below, the content processing engine 306 is configured to generate, from 2D content included in the content data store 308c, 3D media elements representing objects included in a scene represented by the 2D content. For example, if the 2D content includes a scene showing a table and chair, the content processing engine generates 3D media elements for each of the table and the chair. The content processing engine 306 then identifies one or more void spaces within the scene. Information defining these void spaces is then written by the content processing engine 306 to the void spaces data store 308b. Once the void spaces are identified, they are accessed by the content marketplace application 302. The content marketplace application 302 provides an opportunity for content presentation opportunities within content (identified via the content data store 308c). Content can be inserted within the void spaces identified by the content processing engine. As content presentation opportunities are purchased via the marketplace application 302, information defining these purchased opportunities is stored in the insertion specifications data store 308a.

The content player application 304 then reads the content from the content data store 308c and insertion specifications (e.g. 480 discussed below) from the insertion specifications data store 308a to dynamically insert media elements into the content from the content data store 308c. Different versions of content may be generated for delivery to different regions (state, country, region) or for a particular set of users within a region (for example, English dialog is replaced with Spanish dialog for a Spanish language station broadcasting in Los Angeles).

The content with the inserted media elements is then provided to content displays 310a-c. In some embodiments, content displays 310a-c are computing devices that include a display device, such as any of a mobile phone (e.g. smart phone), smart TV, laptop, or desktop computer. In some embodiments, the content player 304 executes on the display device itself. In other embodiments, the content player 304 executes on back-end server type hardware, or is implemented via a cloud-based topology.

In the disclosed embodiments, audio video content (AV) is stored on a back-end or cloud-based server system. The server may implement, for example, a Content Distribution Network (CDN) of an Over the Top (OTT) streaming service. In some aspects, the content distribution server is a playout center of a broadcast service such as a cable company or an Over the Air (OTA) station.

Figure 4:
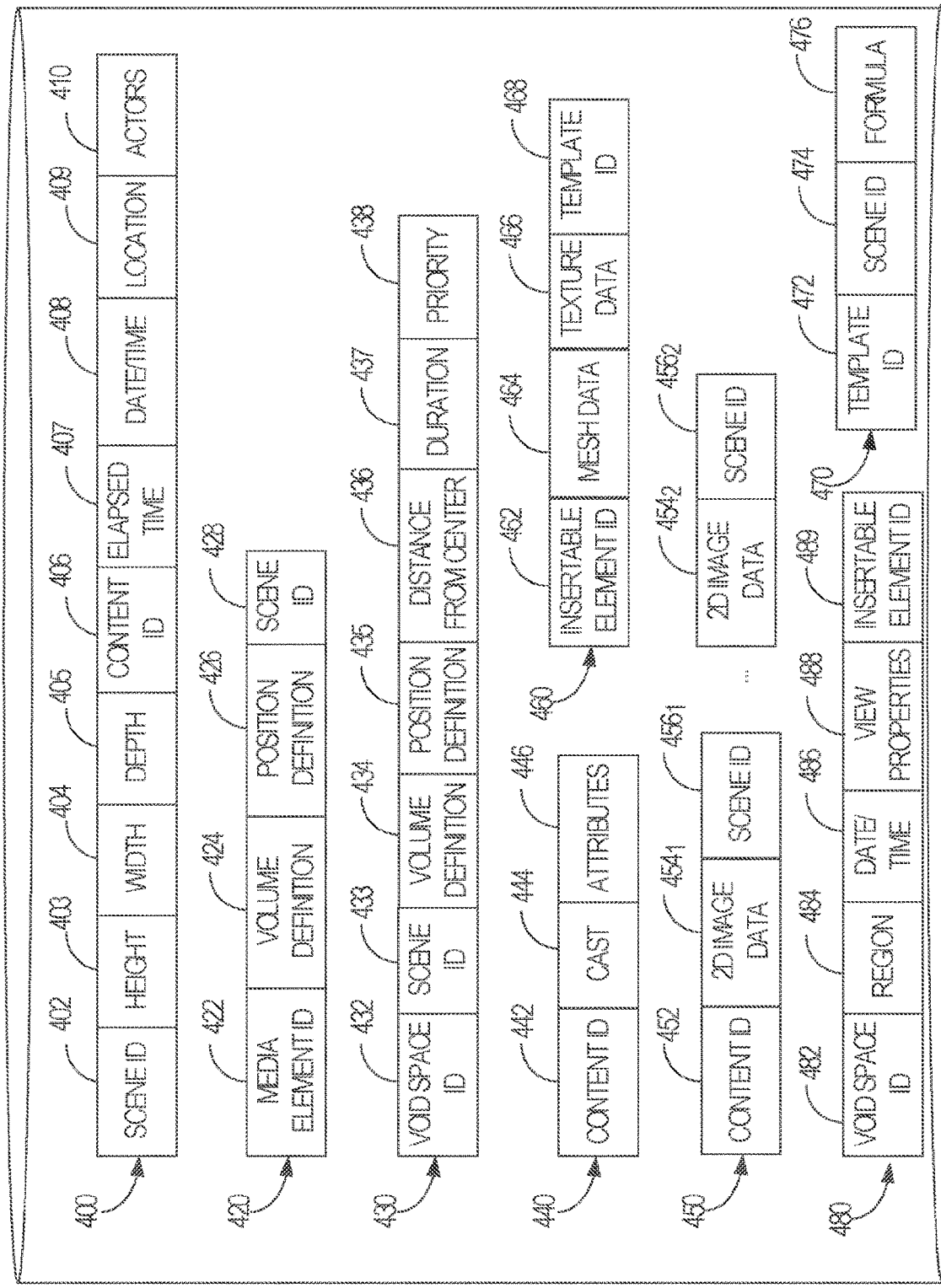
FIG. 4 shows example data structures implemented by one or more of the disclosed embodiments.

FIG. 4 shows example data structures implemented by one or more of the disclosed embodiments. While the data structures of FIG. 4 are discussed below as relational database tables, one of skill would understand that some of the disclosed embodiments utilize alternative data structure organizations without departing from the scope of the data discussed below. For example, various embodiments implement unstructured data stores and/or traditional in-memory structures such as linked lists, arrays, heaps, or other data organizational structures.

FIG. 4 shows a scene table 400, media element table 420, void space table 430, content properties table 440, content data table 450, insertable element table 460, and template table 470. The scene table 400 includes a scene identifier field 402, height field 403, width field 404, depth field 405, content identifier field 406, elapsed time field 407, date/time field 408, location field 409, and actors field 410. The scene identifier field 402 uniquely identifies a scene. The height field 403, width field 404, and depth field 405 define a height, width, and depth of the scene respectively. The content id field 406 identifies content that the scene (identified via 402) is included in (e.g. content data table 450 discussed below). The elapsed time field 407 defines a length, in time units, of the scene. The date/time field 408 identifies a date/time of when the scene occurs. In some embodiments, the date/time reflects an actual real-world time. In some other embodiments, the date/time reflects a simulated time, which indicates a setting for the scene. The location field 409 defines a location of the scene, such as a geographical location (e.g. GPS coordinates). The actors field 410 defines identifies of one or more actors present in the scene.

The media elements table 420 includes a media element identifier field 422, volume definition field 424, position definition field 426, and a scene identifier. The media element identifier field 422 uniquely identifies a single media element. A media element is a distinct three-dimensional object that appears in a scene. The volume definition field 424 defines a volume occupied by the element. The position definition field 426 identifies a position of the media element within the scene. The position may be provided with respect to a particular corner of a total 3D space of the scene. The scene identifier field 428 identifies a scene in which the media element appears. The scene identifier field 428 is cross referenceable with the scene identifier field 402 and/or scene identifier(s) 454, discussed below.

The void space table 430 includes a void space identifier 432, a scene identifier field 433, a volume definition field 434, position definition field 435, distance from center field 436, duration field 437, and a priority field 438. The void space identifier field 432 uniquely identifies a single void space. The scene identifier field 433 identifies a scene in which the void space is present (cross referenceable with the scene id fields 402, 428, and/or 456, discussed below). The volume definition field 434 defines a volume inhabited or occupied by the void space (identified via 432). In some embodiments, the volume definition field 434 defines a plurality of polygons that define the volume. The position definition field 434 defines a location of the void space within the scene. In some embodiments, the position is specified relative to a reference corner of a total 3D volume of the scene. The distance from center field 436 defines a distance of the void space (e.g. a centroid of the void space) from a center of the scene (identified via field 433). The distance from center information stored in field 436 is derived, in some embodiments, from the position definition information 435. The duration field 437 stores a duration, in time units (e.g. milliseconds or seconds), the void space is present in the scene. The priority field 438 defines a priority of the void space for insertion of a three-dimension media element, discussed further below. Note that the void spaces data store 308b discussed above with respect to FIG. 3 includes the void spaces table 430 in at least some embodiments.

The content attributes table 440 includes a content identifier field 442, a cast field 444, and an attributes field 446. The content identifier field 442 uniquely identifies content, such as a particular movie, tv show, video, or other content. The cast field 444 identifies a cast of the content (e.g. movie cast, tv show cast, etc). The attributes field 446 identifies one or more attributes of the content, such as date of production, title, producer, director, run time, rating (e.g. PG-13, etc) or other attribute.

The content data table 450 includes a content identifier 452, and a plurality of content data pairs, each pair including 2D image data $454_{1 \ldots n}$, and scene identifier $456_{1 \ldots n}$. The content identifier 452 uniquely identifies content, and is cross referenceable with the content identifier field 442. The 2D image data represents a 2D scene present in the content. The scene identifier 456 identifies a scene in which the 2D image data scene is represented. Thus, a plurality of 2D image data field 454 may share a common scene identifier value in their respective scene identifier fields 456. Note that the content data store 308c discussed above with respect to FIG. 3 includes the content table 450 in at least some embodiments. Additionally, one or more of the scene table 400, content attributes table 440 are included in the content table 408c in at least some embodiments.

The insertable element table 460 includes an insertable element identifier 462, mesh data field 464, texture data field 466, and a template identifier field 468. The insertable element identifier field 462 uniquely identifies an insertable 3D media element. The mesh data field 464 stores data defining a 3D mesh. The 3D mesh may define a plurality of polygons that are joined at their vertexes to create a 3D space. The texture data 466 defines a texture of the insertable element. The template identifier field 468 defines a template to use when inserting the insertable 3D element into a scene.

The template table 470 includes a template identifier field 472, scene identifier field 474, and a formula field 476. The template identifier field 472 uniquely identifies a template. The scene identifier field 474 identifies a scene for which the template is used to render a 3D insertable object into the scene. The formula field 476 defines a one or more transformation operations performed on the 3D insertable element before the element is inserted into a scene.

The insert specifications table 480 includes a void space identifier 482, region identifier field 484, date/time field 486, a view properties field 488, and an insertable element identifier 489. The void space identifier field 482 identifies a particular void space within content of the content table 450. The void space identifier field 482 can be cross referenced with void space identifier field 432. The region identifier field 484 identifies a region where the insertion (identified by the particular row of the insert specifications table 480) is to occur. The region identifier field 484 identifies a particular geographical region, such as a country, state, or other geographic boundary within which the insertion is to be performed. The region identified is applicable to where the content is ultimately displayed to a viewer and not necessarily where the insertion is physically performed. The date/time field 486 identifies one or more of the date range and/or time range when the insertion is to be performed. As with the region, the date/time field 486 applies to where content is displayed to a viewer and not necessarily where the insertion is physically performed. The view properties field 488 identifies one or more other properties of content display that are used to identify content display subject to the insertion into the void space (identified via 482). The insertable element id field 489 identifies a 3D media element to be inserted into the void space. The insertable element id field 489 is cross referenced with the insertable element id field 462, discussed above. In some embodiments, the insertion specification table 480 is included in the insertion specifications data store 308a, discussed above with respect to FIG. 3.

Figure 5:
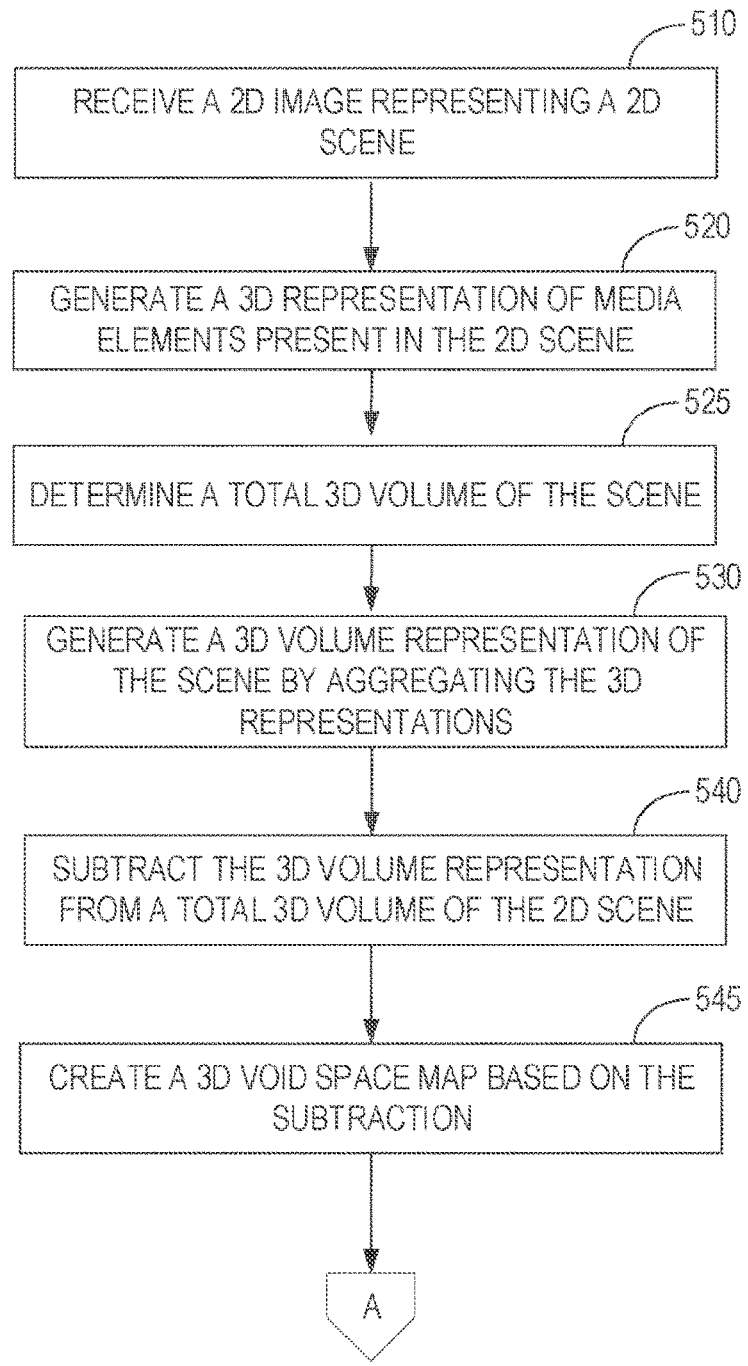
FIGS. 5-6 show a flowchart of a process for inserting a 3D media element into a 3D representation of a 2D image.
Figure 6:
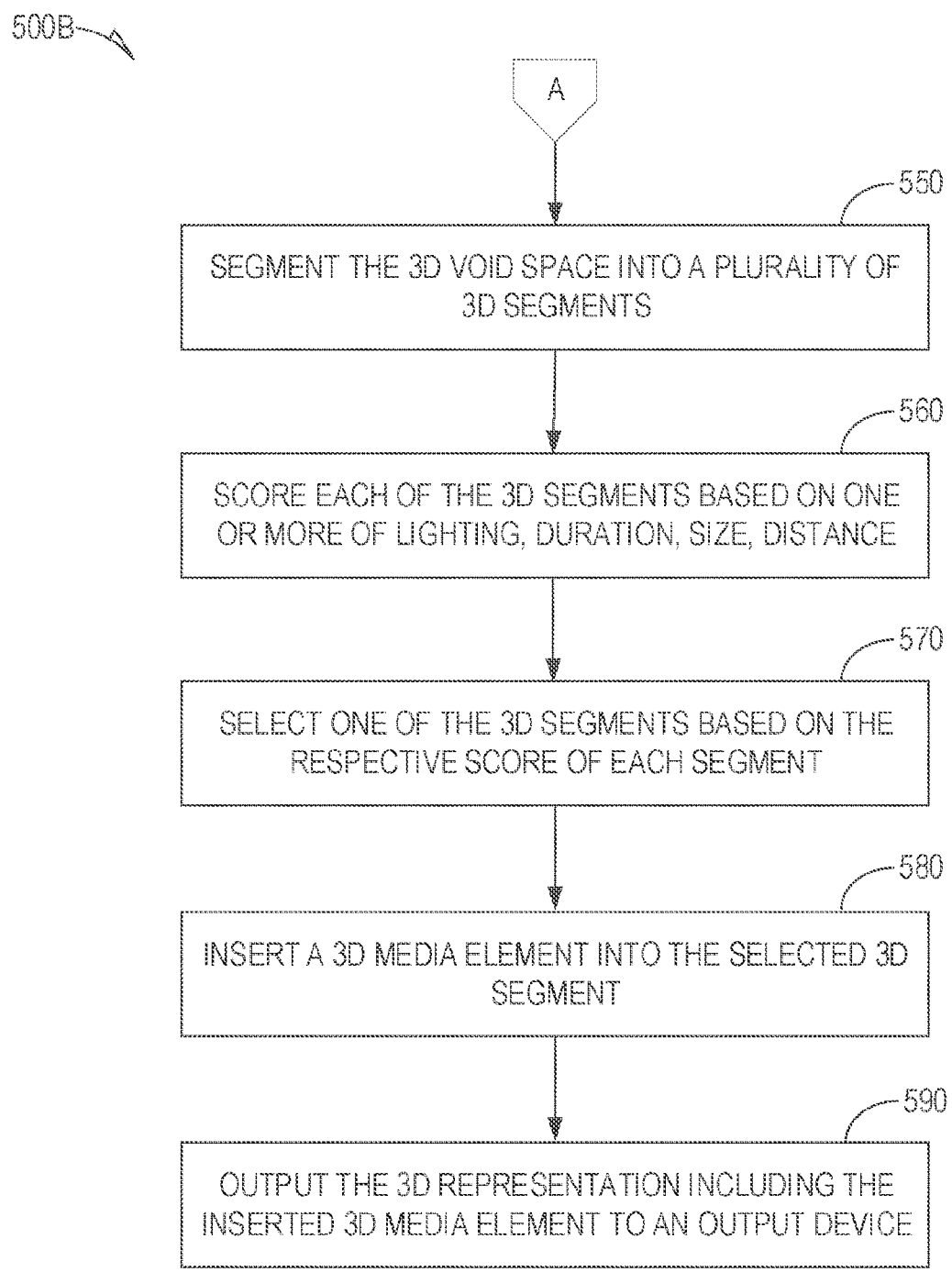

FIGS. 5-6 show a flowchart of a process for inserting a 3D media element into a 3D representation of a 2D image. In some aspects, one or more of the functions discussed below with respect to FIG. 5 is performed by hardware processing circuitry. For example, in some embodiments, one or more hardware memories store instructions that when executed configure the hardware processing circuitry to perform one or more of the functions discussed below with respect to FIG. 5.

In operation 510, a 2D image is received. The image represents a two-dimensional scene. In some embodiments, the 2D image is part of a video. Thus, in these embodiments, a plurality of 2D images may be received with each of the 2D images representing a portion of the video.

In operation 520, a 3D representation of media elements present in the scene is generated. Thus, for example, while image 102a of FIG. 1 shows a two-dimensional image, operation 520 generates, in this example, 3D representations of each of the two actors 102a and 102b, and the cereal box 104. Additional 3D representations of the counter 106, chair 108, and window 110 are also generated. In some embodiments, the 3D representations of each media element are defined via a mesh. In some embodiments, the mesh is comprised of a plurality of polygons connected at the vertices to form a 3D representation of a media element. Each 3D representation also includes position information defining a position of the 3D element within the scene. The position information, along with the mesh definition provides for a determination of space occupied by the 3D media element within the scene. Collectively, the 3D representation(s) of media element in the scene form a 3D representation of the scene itself.

In operation 525, a total three-dimensional volume of the scene is determined. The total 3D volume of the scene may be determined by multiplying a width by a height of the scene, and further multiplying by a distance of an object furthest from a perspective or camera capturing the scene. The distance furthest from the perspective or camera may be identified by one the 3D representations of the media elements discussed above with respect to operation 520. For example, operation 525 may search the 3D media elements of operation 520 to identify one of the media elements occupying a volume furthest from a perspective or camera capturing the scene.

In operation 530, a 3D volume representation of the scene is generated. The 3D volume representation is generated by aggregating the 3D representations of the media elements within the scene that are generated in operation 520. Thus, continuing with the example discussed above with respect to operation 520, operation 530 aggregates volume occupied by the two actors 102a and 102b, cereal box 104, counter 106, chair 108, a window 110 (among other items in the scene 100 not identified here).

In operation 540, the 3D volume representation generated in operation 530 is subtracted from the total 3D volume of the 3D representation.

In operation 545, a 3D void space is defined based on the difference resulting from the subtraction of operation 540.

Continuing to FIG. 6, operation 550 segments the 3D void space defined by operation 545 into a plurality of 3D segments. In some aspects, the 3D segments are of equivalent size. In some embodiments, some of the 3D segments are generated to conform to one or more of the 3D media element representations generated in operation 520.

In operation 560, each of the 3D segments is scored based on one or more of tracking characteristics of the 3D segment, lighting of the 3D segment, duration of time the segment is in focus or otherwise included in the 2D content, a size of the 3D segment, and a distance of the 3D segment from a center of a scene including the 3D segment. Tracking characteristics of the scene may be derived from planer camera tracking characteristics, for example, those obtained from Visual Effects Software (VFX). In some aspects, additional factors are considered when determining a score of a respective segment. For example, other actors considered include, in various embodiments, one or more of a distance from a viewing perspective of the scene or a distance from a camera shooting the scene, a proximity of the 3D segment to one or more actors in the scene. In some embodiments, whether the 3D segment is handled by an actor is considered.

Additional factors considered include identities of actors included in the scene (e.g. field 410), the cast included in the content (e.g. field 444), a location of the scene (e.g. field 409), a year and time of day of a scene including the 3D segment (e.g. field 408). In some embodiments, operation 560 considers one or more of a genre and/o sub-genre of the content, a mood of a scene including the 3D element, or a theme of the content. Information about a viewing user may also be used to select content for insertion. For example, each of the content displays 302a-c discussed above with respect to FIG. 3 may be transmitted to devices associated with individual user accounts. Each of the user accounts define one or more attributes of the user, such as the user's age, gender, interests, past purchase history, and other characteristics. One or more of these factors are considered, in at least some embodiments, when scoring each of the 3D segments.

In operation 570, a segment is selected based on the respective score of each segment. For example, in some aspects, a segment having a highest numerical score is selected. In some embodiments, the segment is selected by a machine learning model. For example, in some embodiments, a model is trained via a data set that identifies 3D segments in a scene. The identified 3D segments are annotated with score or priority information. In some aspects, the annotations are generated via human based supervised learning techniques. From the training data, the model learns which 3D segments are most valuable for insertion of additional 3D media elements. In some embodiments, the model is provided with one or more of a 3D segment's attributes as described above (size, duration, actors in the scene, distance from a center of the scene, etc). The model is provided with a plurality of segments, for example, multiple segments occurring in a particular content scene. The model then ranks the segments based on the learned data from the training. The selection of operation 570 is then configured, in these embodiments, to select a highest ranked segment of the scene for insertion of an additional 3D media element.

In operation 580, a 3D media element is inserted into the selected 3D segment.

In operation 590, an output signal is generated based on the 3D representation of the scene including the inserted 3D media element. In some embodiments, operation 590 includes displaying a 2D version of the 3D representation on an electronic display. In some embodiments, the output signal writes an output file storing a 2D version of the scene. In some embodiments, operation 590 includes projecting the 3D media elements included in the 3D representation (including the inserted 3D media element) of the scene onto a 2D image.

In some embodiments, the output signal represents a 'flat' video (conventional video that is a sequence of individual images displayed on a screen or some other mechanism for making the content viewable). In some embodiments, the inserted 3D element is included in a first video that is overlaid on another (the primary) video. In these embodiments, the primary video includes an indication of transparency of various objects included in a scene such that the inserted 3D media element is correctly displayed with other objects included in the scene.

Figure 7:
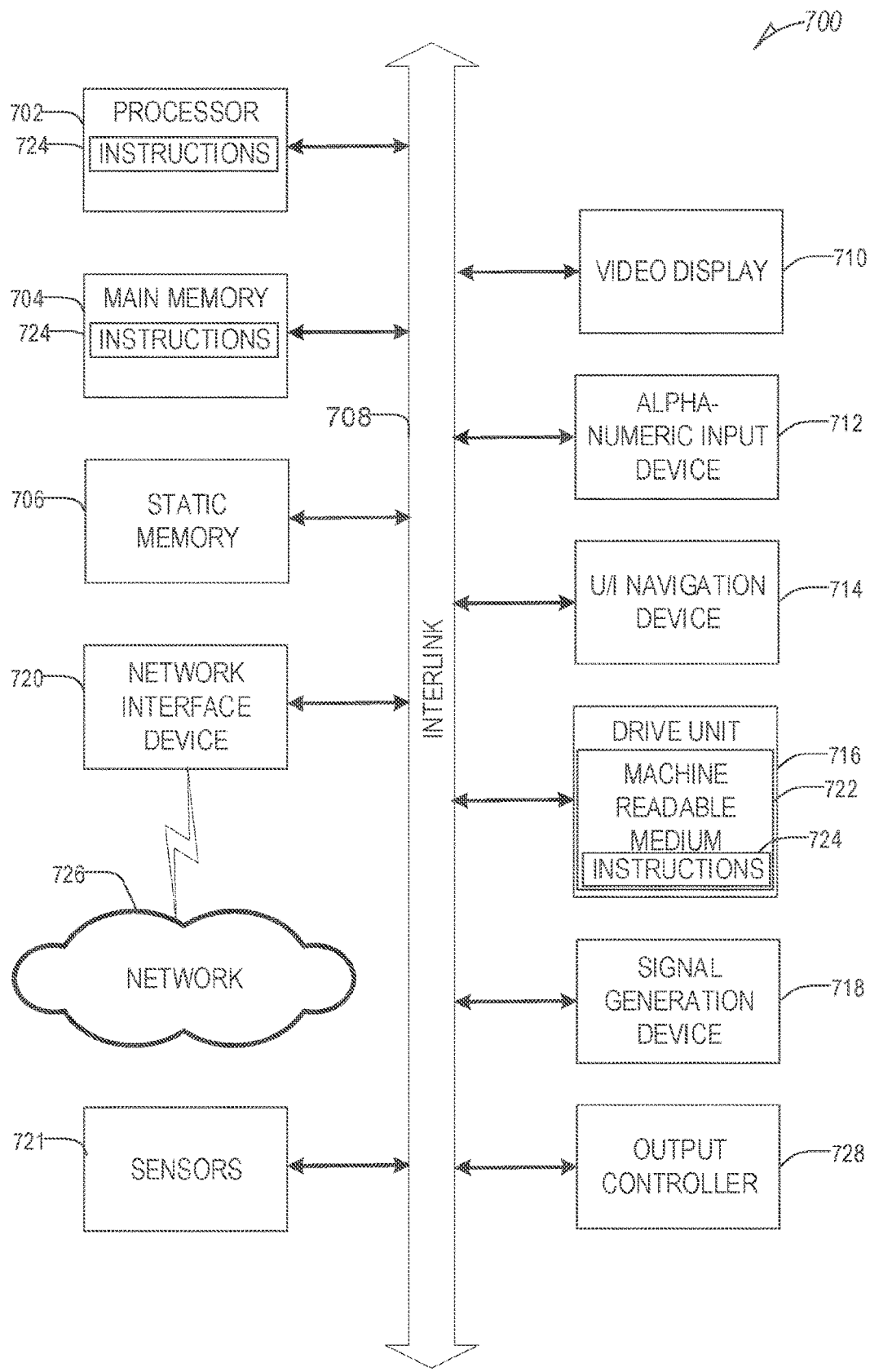
FIG. 7 illustrates a block diagram of an example machine that is implemented in one or more of the disclosed embodiments.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 700 may perform one or more of the processes described above with respect to FIGS. 1-6 above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a system of modifying media content, comprising: hardware processing circuitry; one or more hardware memories storing instructions that when executed configure the hardware processing circuitry to perform operations comprising: obtaining one or more two dimensional (2D) images representing a 2D scene including the media content; generating, based on the one or more of the 2D images, a three-dimensional (3D) representation of media elements present in the 2D scene, two of the three dimensions identifying a location within a respective image of the media element and a third dimension identifying a distance of the media element from a captured perspective of the scene; creating a 3D volume representation of the scene by aggregating the 3D representations; creating a map of 3D void space in the 2D scene by subtracting the 3D volume representation from a total 3D volume of the 2D scene; segmenting the 3D void space into a plurality of 3D segments; scoring each of the plurality of 3D segments based on one or more of tracking characteristics of the 3D void segment, lighting characteristics of the respective 3D segment, a duration of the respective 3D segment, a size of the respective 3D segment, or a distance of the respective 3D segment from a center of the 2D scene; selecting one of the 3D segments based on the respective score of each 3D segment; inserting a 3D media element into the selected 3D segment; and modifying the one or more 2D images to include the inserted 3D media element within the selected 3D segment.

In Example 2, the subject matter of Example 1 optionally includes wherein the creating of the 3D volume representation of the scene comprises aggregating 2D images representing the scene.

In Example 3, the subject matter of any one or more of Examples 1-2 optionally include wherein the selecting of the 3D segment comprises providing a machine learning model with one or more characteristics of each of the plurality of 3D segments and receiving an indication of the selection from the machine learning model.

In Example 4, the subject matter of any one or more of Examples 1-3 optionally include the operations further comprising displaying a confirmation dialog indicating the selection; receiving input indicating whether the selection is confirmed, and training the machine learning model based on the input.

In Example 5, the subject matter of any one or more of Examples 3-4 optionally include the operations further comprising determining whether each of the plurality of segments conforms to a predefined shape, storing an indication of the determination in association with the segment, wherein the indications are provided to the machine learning model.

In Example 6, the subject matter of Example 5 optionally includes wherein the predefined shapes include one or more of a cube, or sphere.

In Example 7, the subject matter of any one or more of Examples 3-6 optionally include providing one or more attributes of the 3D media element to a machine learning model, wherein the machine learning model is configured to select the 3D segment based on the one or more attributes.

In Example 8, the subject matter of any one or more of Examples 5-7 optionally include determining a depth of each of the 3D segments and storing an indication of the depth in association with the 3D segment, wherein the indications of depth are provided to the machine learning model.

In Example 9, the subject matter of any one or more of Examples 5-8 optionally include determining a subset of the plurality of 3D segments that are not always empty during the scene, and inhibiting providing segments in the subset to the machine learning model.

In Example 10, the subject matter of any one or more of Examples 5-9 optionally include wherein the attributes of the plurality of 3D segments include one or more of a distance of the segment from the viewed perspective, a proximity to one or more objects in the scene, or a lighting of the segment, a geographic location of the scene, a time of day or date of the scene, a type of objects in the scene, or one or more attributes of a production including the scene.

In Example 11, the subject matter of any one or more of Examples 5-10 optionally determining, for at least some of the plurality of 3D segments, a difficulty of rotoscoping the segment, and storing an indication of the difficult in association with the respective 3D segment.

In Example 12, the subject matter of any one or more of Examples 5-11 optionally include performing speech recognition of audio data associated with the 2D scene, determining one or more characteristics of the 2D scene based on the speech recognition, and providing the one or more characteristics to the machine learning model.

In Example 13, the subject matter of any one or more of Examples 1-12 optionally include generating a contextual basis for the 2D scheme, the contextual basis defining one or more of a time of day, a location, or an activity rating, and selecting the 3D media element based at least in part on the contextual basis.

In Example 14, the subject matter of Example 13 optionally includes listing the plurality of 3D segments for sale on an online marketplace.

In Example 15, the subject matter of Example 14 optionally includes wherein the online marketplace is configured with search capabilities to allow identification of a 3D segment by production, time on screen, a prominence score of the segment, an audience rating of the production.

In Example 16, the subject matter of any one or more of Examples 1-15 optionally include receiving media content from a cryptographically signed ledger, the media content including the media elements and indications of one or more of a props inventory for the 2D scene, a camera location for the 2D scene, or a lighting arrangement for the 2D scene, and adding the modified one or more images to the ledger; and cryptographically signing the ledger including the modified one or more images.

In Example 17, the subject matter of Example 16 optionally includes receiving a template for the 3D media element from the ledger, and adjusting the 3D media element based on the template.

In Example 18, the subject matter of Example 17 optionally includes wherein the template is received from the ledger based on the 2D scene.

In Example 19, the subject matter of any one or more of Examples 1-18 optionally include wherein the modifying is performed at a mobile device.

In Example 20, the subject matter of Example 19 optionally includes performing the modification of the 3D media element at the mobile device based on one or more of a location of the mobile device, one or more attributes of a user profile associated with the mobile device, a language setting of the mobile device, and displaying the modified one or more two dimensional images on an electronic display of the mobile device.

Example 21 is a method of modifying media content, comprising obtaining one or more two dimensional (2D) images representing a 2D scene including the media content; generating, based on the one or more of the 2D images, a three-dimensional (3D) representation of media elements present in the 2D scene, two of the three dimensions identifying a location within a respective image of the media element and a third dimension identifying a distance of the media element from a captured perspective of the scene; creating a 3D volume representation of the scene by aggregating the 3D representations; creating a map of 3D void space in the 2D scene by subtracting the 3D volume representation from a total 3D volume of the 2D scene; segmenting the 3D void space into a plurality of 3D segments; scoring each of the plurality of 3D segments based on one or more of tracking characteristics of the 3D void segment, lighting characteristics of the respective 3D segment, a duration of the respective 3D segment, a size of the respective 3D segment, or a distance of the respective 3D segment from a center of the 2D scene; selecting one of the 3D segments based on the respective score of each 3D segment; inserting a 3D media element into the selected 3D segment; and modifying the one or more 2D images to include the inserted 3D media element within the selected 3D segment.

In Example 22, the subject matter of Example 21 optionally includes wherein the creating of the 3D volume representation of the scene comprises aggregating 2D images representing the scene.

In Example 23, the subject matter of any one or more of Examples 21-22 optionally include optionally include wherein the selecting of the 3D segment comprises providing a machine learning model with one or more characteristics of each of the plurality of 3D segments and receiving an indication of the selection from the machine learning model.

In Example 24, the subject matter of any one or more of Examples 21-23 optionally include displaying a confirmation dialog indicating the selection; receiving input indicating whether the selection is confirmed, and training the machine learning model based on the input.

In Example 25, the subject matter of any one or more of Examples 23-24 optionally include determining whether each of the plurality of segments conforms to a predefined shape, storing an indication of the determination in association with the segment, wherein the indications are provided to the machine learning model.

In Example 26, the subject matter of Example 25 optionally includes wherein the predefined shapes include one or more of a cube, or sphere.

In Example 27, the subject matter of any one or more of Examples 23-26 optionally include providing one or more attributes of the 3D media element to a machine learning model, wherein the machine learning model is configured to select the 3D segment based on the one or more attributes.

In Example 28, the subject matter of any one or more of Examples 25-27 optionally include determining a depth of each of the 3D segments and storing an indication of the depth in association with the 3D segment, wherein the indications of depth are provided to the machine learning model.

In Example 29, the subject matter of any one or more of Examples 25-28 optionally include determining a subset of the plurality of 3D segments that are not always empty during the scene, and inhibiting providing segments in the subset to the machine learning model.

In Example 30, the subject matter of any one or more of Examples 25-29 optionally include wherein the attributes of the plurality of 3D segments include one or more of a distance of the segment from the viewed perspective, a proximity to one or more objects in the scene, or a lighting of the segment, a geographic location of the scene, a time of day or date of the scene, a type of objects in the scene, or one or more attributes of a production including the scene.

In Example 31, the subject matter of any one or more of Examples 25-30 optionally determining, for at least some of the plurality of 3D segments, a difficulty of rotoscoping the segment, and storing an indication of the difficult in association with the respective 3D segment.

In Example 32, the subject matter of any one or more of Examples 25-31 optionally include performing speech recognition of audio data associated with the 2D scene, determining one or more characteristics of the 2D scene based on the speech recognition, and providing the one or more characteristics to the machine learning model.

In Example 33, the subject matter of any one or more of Examples 21-32 optionally include generating a contextual basis for the 2D scheme, the contextual basis defining one or more of a time of day, a location, or an activity rating, and selecting the 3D media element based at least in part on the contextual basis.

In Example 34, the subject matter of any one or more of Examples 24-33 optionally includes listing the plurality of 3D segments for sale on an online marketplace.

In Example 35, the subject matter of Example 34 optionally includes wherein the online marketplace is configured with search capabilities to allow identification of a 3D segment by production, time on screen, a prominence score of the segment, an audience rating of the production.

In Example 36, the subject matter of any one or more of Examples 21-35 optionally include: receiving media content from a cryptographically signed ledger, the media content including the media elements and indications of one or more of a props inventory for the 2D scene, a camera location for the 2D scene, or a lighting arrangement for the 2D scene, and adding the modified one or more images to the ledger; and cryptographically signing the ledger including the modified one or more images.

In Example 37, the subject matter of Example 36 optionally includes receiving a template for the 3D media element from the ledger, and adjusting the 3D media element based on the template.

In Example 38, the subject matter of Example 37 optionally includes wherein the template is received from the ledger based on the 2D scene.

In Example 39, the subject matter of any one or more of Examples 21-38 optionally include wherein the modifying is performed at a mobile device.

In Example 40, the subject matter of Example 39 optionally includes performing the modification of the 3D media element at the mobile device based on one or more of a location of the mobile device, one or more attributes of a user profile associated with the mobile device, a language setting of the mobile device, and displaying the modified one or more two dimensional images on an electronic display of the mobile device.

Example 41 is a non-transitory computer readable storage medium comprising instructions that when executed configure hardware processing circuitry to perform operations comprising: obtaining one or more two dimensional (2D) images representing a 2D scene including the media content; generating, based on the one or more of the 2D images, a three-dimensional (3D) representation of media elements present in the 2D scene, two of the three dimensions identifying a location within a respective image of the media element and a third dimension identifying a distance of the media element from a captured perspective of the scene; creating a 3D volume representation of the scene by aggregating the 3D representations; creating a map of 3D void space in the 2D scene by subtracting the 3D volume representation from a total 3D volume of the 2D scene; segmenting the 3D void space into a plurality of 3D segments; scoring each of the plurality of 3D segments based on one or more of tracking characteristics of the 3D void segment, lighting characteristics of the respective 3D segment, a duration of the respective 3D segment, a size of the respective 3D segment, or a distance of the respective 3D segment from a center of the 2D scene; selecting one of the 3D segments based on the respective score of each 3D segment; inserting a 3D media element into the selected 3D segment; and modifying the one or more 2D images to include the inserted 3D media element within the selected 3D segment.

In Example 42, the subject matter of Example 41 optionally includes wherein the creating of the 3D volume representation of the scene comprises aggregating 2D images representing the scene.

In Example 43, the subject matter of any one or more of Examples 41-42 optionally include wherein the selecting of the 3D segment comprises providing a machine learning model with one or more characteristics of each of the plurality of 3D segments and receiving an indication of the selection from the machine learning model.

In Example 44, the subject matter of any one or more of Examples 41-43 optionally include the operations further comprising displaying a confirmation dialog indicating the selection; receiving input indicating whether the selection is confirmed, and training the machine learning model based on the input.

In Example 45, the subject matter of Example 44 optionally includes the operations further comprising determining whether each of the plurality of segments conforms to a predefined shape, storing an indication of the determination in association with the segment, wherein the indications are provided to the machine learning model.

In Example 46, the subject matter of Example 45 optionally includes wherein the predefined shapes include one or more of a cube, or sphere.

In Example 47, the subject matter of any one or more of Examples 44-46 optionally include operations comprising providing one or more attributes of the 3D media element to a machine learning model, wherein the machine learning model is configured to select the 3D segment based on the one or more attributes.

In Example 48, the subject matter of any one or more of Examples 45-47 optionally include determining a depth of each of the 3D segments and storing an indication of the depth in association with the 3D segment, wherein the indications of depth are provided to the machine learning model.

In Example 49, the subject matter of any one or more of Examples 45-48 optionally include determining a subset of the plurality of 3D segments that are not always empty during the scene, and inhibiting providing segments in the subset to the machine learning model.

In Example 50, the subject matter of any one or more of Examples 45-49 optionally include wherein the attributes of the plurality of 3D segments include one or more of a distance of the segment from the viewed perspective, a proximity to one or more objects in the scene, or a lighting of the segment, a geographic location of the scene, a time of day or date of the scene, a type of objects in the scene, or one or more attributes of a production including the scene.

In Example 51, the subject matter of any one or more of Examples 45-50 optionally determining, for at least some of the plurality of 3D segments, a difficulty of rotoscoping the segment, and storing an indication of the difficult in association with the respective 3D segment.

In Example 52, the subject matter of any one or more of Examples 45-51 optionally include performing speech recognition of audio data associated with the 2D scene, determining one or more characteristics of the 2D scene based on the speech recognition, and providing the one or more characteristics to the machine learning model.

In Example 53, the subject matter of any one or more of Examples 41-52 optionally include generating a contextual basis for the 2D scheme, the contextual basis defining one or more of a time of day, a location, or an activity rating, and selecting the 3D media element based at least in part on the contextual basis.

In Example 54, the subject matter of any one or more of Examples 44-53 optionally includes listing the plurality of 3D segments for sale on an online marketplace.

In Example 55, the subject matter of Example 54 optionally includes optionally includes wherein the online marketplace is configured with search capabilities to allow identification of a 3D segment by production, time on screen, a prominence score of the segment, an audience rating of the production.

In Example 56, the subject matter of any one or more of Examples 41-55 optionally include the operations further comprising: receiving media content from a cryptographically signed ledger, the media content including the media elements and indications of one or more of a props inventory for the 2D scene, a camera location for the 2D scene, or a lighting arrangement for the 2D scene, and adding the modified one or more images to the ledger; and cryptographically signing the ledger including the modified one or more images.

In Example 57, the subject matter of Example 56 optionally includes receiving a template for the 3D media element from the ledger, and adjusting the 3D media element based on the template.

In Example 58, the subject matter of Example 57 optionally includes wherein the template is received from the ledger based on the 2D scene.

In Example 59, the subject matter of any one or more of Examples 41-58 optionally include wherein the modifying is performed at a mobile device.

In Example 60, the subject matter of Example 59 optionally includes performing the modification of the 3D media element at the mobile device based on one or more of a location of the mobile device, one or more attributes of a user profile associated with the mobile device, a language setting of the mobile device, and displaying the modified one or more two dimensional images on an electronic display of the mobile device.

Example 61 is an apparatus for modifying media content, comprising means for obtaining one or more two dimensional (2D) images representing a 2D scene including the media content; means for generating, based on the one or more of the 2D images, a three-dimensional (3D) representation of media elements present in the 2D scene, two of the three dimensions identifying a location within a respective image of the media element and a third dimension identifying a distance of the media element from a captured perspective of the scene; means for creating a 3D volume representation of the scene by aggregating the 3D representations; means for creating a map of 3D void space in the 2D scene by subtracting the 3D volume representation from a total 3D volume of the 2D scene; means for segmenting the 3D void space into a plurality of 3D segments; means for scoring each of the plurality of 3D segments based on one or more of tracking characteristics of the 3D void segment, lighting characteristics of the respective 3D segment, a duration of the respective 3D segment, a size of the respective 3D segment, or a distance of the respective 3D segment from a center of the 2D scene; means for selecting one of the 3D segments based on the respective score of each 3D segment; means for inserting a 3D media element into the selected 3D segment; and means for modifying the one or more 2D images to include the inserted 3D media element within the selected 3D segment.

In Example 62, the subject matter of Example 61 optionally includes wherein the means for creating of the 3D volume representation of the scene is configured to aggregate 3D media items generated from 2D images representing the scene.

In Example 63, the subject matter of any one or more of Examples 61-62 optionally include wherein the means for selecting of the 3D segment is configured to provide a machine learning model with one or more characteristics of each of the plurality of 3D segments and the apparatus further includes means for receiving an indication of the selection from the machine learning model.

In Example 64, the subject matter of any one or more of Examples 61-63 optionally include means for displaying a confirmation dialog indicating the selection; means for receiving input indicating whether the selection is confirmed, and means for training the machine learning model based on the input.

In Example 65, the subject matter of Example 64 optionally includes means for determining whether each of the plurality of segments conforms to a predefined shape, means for storing an indication of the determination in association with the segment, wherein the indications are provided to the machine learning model.

In Example 66, the subject matter of Example 65 optionally includes wherein the predefined shapes include one or more of a cube, or sphere.

In Example 67, the subject matter of any one or more of Examples 63-66 optionally include means for providing one or more attributes of the 3D media element to a machine learning model, wherein the machine learning model is configured to select the 3D segment based on the one or more attributes.

In Example 68, the subject matter of any one or more of Examples 65-67 optionally include means for determining a depth of each of the 3D segments and storing an indication of the depth in association with the 3D segment, wherein the indications of depth are provided to the machine learning model.

In Example 69, the subject matter of any one or more of Examples 65-68 optionally include means for determining a subset of the plurality of 3D segments that are not always empty during the scene, and means for inhibiting providing segments in the subset to the machine learning model.

In Example 70, the subject matter of any one or more of Examples 65-69 optionally include wherein the attributes of the plurality of 3D segments include one or more of a distance of the segment from the viewed perspective, a proximity to one or more objects in the scene, or a lighting of the segment, a geographic location of the scene, a time of day or date of the scene, a type of objects in the scene, or one or more attributes of a production including the scene.

In Example 71, the subject matter of any one or more of Examples 65-70 optionally include means for determining, for at least some of the plurality of 3D segments, a difficulty of rotoscoping the segment, and means for storing an indication of the difficult in association with the respective 3D segment.

In Example 72, the subject matter of any one or more of Examples 65-71 optionally include means for performing speech recognition of audio data associated with the 2D scene, determining one or more characteristics of the 2D scene based on the speech recognition, and means for providing the one or more characteristics to the machine learning model.

In Example 73, the subject matter of any one or more of Examples 61-72 optionally include means for generating a contextual basis for the 2D scheme, the contextual basis defining one or more of a time of day, a location, or an activity rating, and selecting the 3D media element based at least in part on the contextual basis.

In Example 74, the subject matter of any one or more of Examples 64-73 optionally includes means for listing the plurality of 3D segments for sale on an online marketplace.

In Example 75, the subject matter of Example 74 optionally includes wherein the means for listing the plurality of 3D segments for sale on the online marketplace is configured with search capabilities to allow identification of a 3D segment by production, time on screen, a prominence score of the segment, an audience rating of the production.

In Example 76, the subject matter of any one or more of Examples 61-75 optionally include: means for receiving media content from a cryptographically signed ledger, the media content including the media elements and indications of one or more of a props inventory for the 2D scene, a camera location for the 2D scene, or a lighting arrangement for the 2D scene, and means for adding the modified one or more images to the ledger; and means for cryptographically signing the ledger including the modified one or more images.

In Example 77, the subject matter of Example 76 optionally includes means for receiving a template for the 3D media element from the ledger, and adjusting the 3D media element based on the template.

In Example 78, the subject matter of Example 77 optionally includes wherein the means for receiving the template is configured to receive the template from the ledger based on the 2D scene.

In Example 79, the subject matter of any one or more of Examples 61-78 optionally include wherein the means for modifying is executed at a mobile device.

In Example 80, the subject matter of Example 79 optionally includes means for performing the modification of the 3D media element at the mobile device based on one or more of a location of the mobile device, one or more attributes of a user profile associated with the mobile device, a language setting of the mobile device, and means for displaying the modified one or more two dimensional images on an electronic display of the mobile device.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. An apparatus for processing media content, the apparatus comprising:
   at least one hardware processor;
   at least one memory storing instructions that when executed cause the at least one hardware processor to perform operations comprising:
      generating three-dimensional (3D) representations of media elements present in one or more two-dimensional (2D) images representing a 2D scene with the media content;
      generating a 3D volume representation of the 2D scene based on aggregating the 3D representations;
      segmenting a 3D void space associated with the 2D scene into a plurality of 3D void segments, the segmenting based on the 3D volume representation;
      inserting a 3D media element into at least one 3D void segment of the plurality of 3D void segments; and
      modifying the one or more 2D images to include the at least one 3D void segment with the 3D media element.

2. The apparatus of claim 1, wherein two of three dimensions of the 3D representations of a media element of the media elements identify a location within a respective image of the media element, and a third dimension identifies a distance of the media element from a captured perspective of the 2D scene.

3. The apparatus of claim 1, wherein the at least one hardware processor further performs operations comprising:
   creating a map of the 3D void space in the 2D scene by subtracting the 3D volume representation from a total 3D volume of the 2D scene.

4. The apparatus of claim 3, wherein the at least one hardware processor further performs operations comprising:
   scoring each 3D void segment of the plurality of 3D void segments based on at least one characteristic of the 3D void segment.

5. The apparatus of claim 4, wherein the at least one characteristic comprises one or more of:
   lighting characteristics of the 3D void segment;
   a duration of the 3D void segment;
   a size of the 3D void segment; and
   a distance of the 3D void segment from a center of the 2D scene.

6. The apparatus of claim 4, wherein the at least one hardware processor further performs operations comprising:
   selecting the at least one 3D void segment from the plurality of 3D void segments based on the scoring.

7. The apparatus of claim 1, wherein the at least one hardware processor further performs operations comprising:
   selecting the at least one 3D void segment based on:
   providing a machine learning model with one or more characteristics of each of the plurality of 3D void segments;
   receiving an indication of a selection of the at least one 3D void segment from the machine learning model; and
   displaying a confirmation dialog indicating the selection.

8. The apparatus of claim 7, wherein the at least one hardware processor further performs operations comprising:
   detecting input indicating whether the selection is confirmed; and
   training the machine learning model based on the input.

9. The apparatus of claim 8, wherein the at least one hardware processor further performs operations comprising:
   performing a determination of whether each of the plurality of 3D void segments conforms to a predefined shape;
   storing an indication of the determination in association with each of the plurality of 3D void segments; and
   training the machine learning model further based on the indication.

10. The apparatus of claim 1, wherein the at least one hardware processor further performs operations comprising:
   receiving the media content from a cryptographically signed ledger, the media content including the media elements and indications of one or more of a props inventory for the 2D scene, a camera location for the 2D scene, or a lighting arrangement for the 2D scene;
   adding the one or more 2D images to the ledger after the modifying; and cryptographically signing the ledger including the one or more 2D images.

11. The apparatus of claim 10, wherein the at least one hardware processor further performs operations comprising:
receiving a template for the 3D media element from the ledger based on the 2D scene; and
adjusting the 3D media element based on the template.

12. A method for processing media content, the method comprising:
generating three-dimensional (3D) representations of media elements present in one or more two-dimensional (2D) images representing a 2D scene with the media content;
generating a 3D volume representation of the 2D scene based on aggregating the 3D representations;
segmenting a 3D void space associated with the 2D scene into a plurality of 3D void segments, the segmenting based on the 3D volume representation;
inserting a 3D media element into at least one 3D void segment of the plurality of 3D void segments; and
modifying the one or more 2D images to include the at least one 3D void segment with the 3D media element.

13. The method of claim 12, further comprising:
creating a map of the 3D void space in the 2D scene by subtracting the 3D volume representation from a total 3D volume of the 2D scene.

14. The method of claim 13, further comprising:
scoring each 3D void segment of the plurality of 3D void segments based on at least one characteristic of the 3D void segment.

15. The method of claim 14, further comprising:
selecting the at least one 3D void segment from the plurality of 3D void segments based on the scoring.

16. The method of claim 12, further comprising:
selecting the at least one 3D void segment based on:
providing a machine learning model with one or more characteristics of each of the plurality of 3D void segments;
receiving an indication of a selection of the at least one 3D void segment from the machine learning model; and
displaying a confirmation dialog indicating the selection.

17. The method of claim 16, further comprising:
detecting input indicating whether the selection is confirmed; and
training the machine learning model based on the input.

18. A computer-readable storage medium comprising instructions that, when executed by one or more processors of a machine, configure the machine to perform operations comprising:
generating three-dimensional (3D) representations of media elements present in one or more two-dimensional (2D) images representing a 2D scene with media content;
generating a 3D volume representation of the 2D scene based on aggregating the 3D representations;
segmenting a 3D void space associated with the 2D scene into a plurality of 3D void segments, the segmenting based on the 3D volume representation;
inserting a 3D media element into at least one 3D void segment of the plurality of 3D void segments; and
modifying the one or more 2D images to include the at least one 3D void segment with the 3D media element.

19. The computer-readable storage medium of claim 18, the operations further comprising:
creating a map of the 3D void space in the 2D scene by subtracting the 3D volume representation from a total 3D volume of the 2D scene;
scoring each 3D void segment of the plurality of 3D void segments based on at least one characteristic of the 3D void segment; and
selecting the at least one 3D void segment from the plurality of 3D void segments based on the scoring.

20. The computer-readable storage medium of claim 18, the operations further comprising:
providing a machine learning model with one or more characteristics of each of the plurality of 3D void segments;
receiving an indication of a selection of the at least one 3D void segment from the machine learning model;
displaying a confirmation dialog indicating the selection;
detecting input indicating whether the selection is confirmed; and
training the machine learning model based on the input.

* * * * *